United States Patent [19]

Funk

[11] E Re. 31,020

[45] Reissued Aug. 31, 1982

[54] METHOD OF MAKING A LINED CONDUIT SECTION

[75] Inventor: Charles F. Funk, Gulfport, Miss.

[73] Assignee: Met-L-Parts, Inc., Gulfport, Miss.

[21] Appl. No.: 310,652

[22] Filed: Oct. 13, 1981

Related U.S. Patent Documents

Reissue of:

[64] Patent No.: 4,251,018
Issued: Feb. 17, 1981
Appl. No.: 27,806
Filed: Apr. 6, 1979

U.S. Applications:

[63] Continuation-in-part of Ser. No. 850,285, Nov. 10, 1977, abandoned.

[51] Int. Cl.[3] ..... B23K 9/23

[52] U.S. Cl. ..... 228/122; 228/122; 228/188; 228/165; 228/225; 228/185

[58] Field of Search ..... 228/122, 165, 178, 263 A, 228/903, 225, 185; 219/127; 285/55

[56] References Cited

U.S. PATENT DOCUMENTS

| | | | |
|---|---|---|---|
| 1,183,308 | 5/1916 | Lepley et al. | 285/55 |
| 1,637,750 | 8/1927 | Kilham | 285/55 |
| 1,858,883 | 5/1932 | Cook et al. | 219/127 |
| 3,204,083 | 8/1965 | Fromm et al. | 228/165 X |
| 4,137,681 | 2/1979 | Pasley | 228/165 X |

*Primary Examiner*—Kenneth J. Ramsey
*Attorney, Agent, or Firm*—Vaden, Eickenroht, Thompson, Bednar & Jamison

[57] ABSTRACT

A curved section is provided for connecting in a conduit through which passes a fluid stream having solid material entrained therein. A plurality of wear strips are attached to the inside wall of the curved section. They are positioned for the solid material to impinge thereon as the fluid stream changes its direction of flow as it passes through the curved section. The wear strips are elongated members of wear resistant material positioned side-by-side along the inside wall against which the solid material impinges. The abutting sides of adjacent wear strips are beveled so that the outer edges of one adjacent strip extends over the inner edge of the other adjacent strip to provide a continuous surface of wear resistant material in the path of the entrained solid material. The wear strips are attached to the side wall of the curved section by bodies of weld metal located in openings in the wear strips that are smaller in cross-sectional area adjacent the wall to which the members are attached than they are on their outside exposed surfaces and the weld metal is applied by sequentially puddling small amounts of weld metal in first one than another of the openings so that the wear strips are not raised to a temperature that would cause the cracking of the hard wear material due to thermal stress.

2 Claims, 8 Drawing Figures

FIG. 1
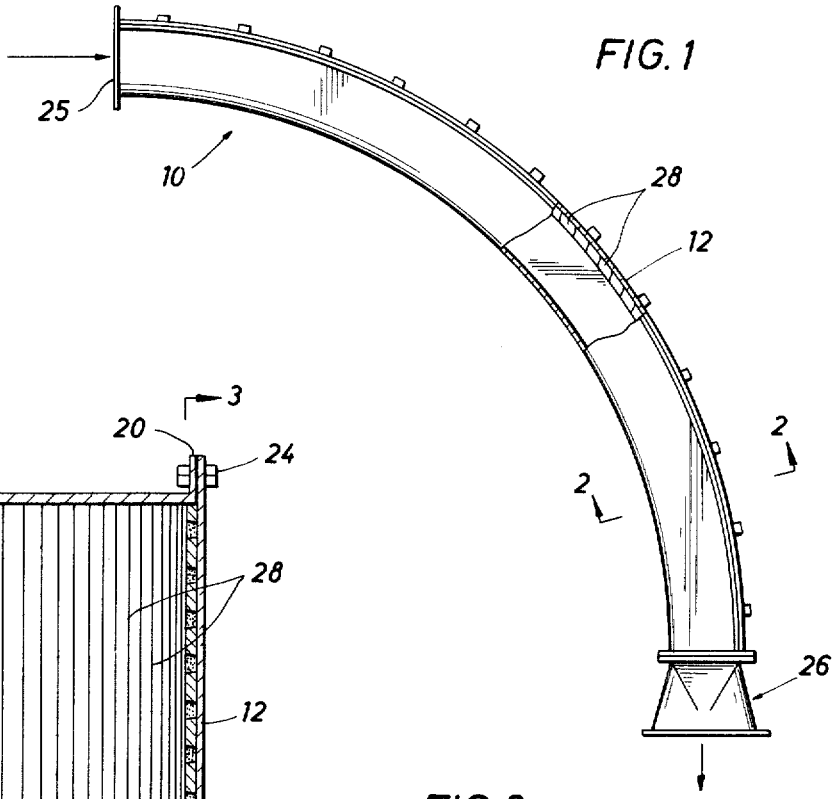
FIG. 2
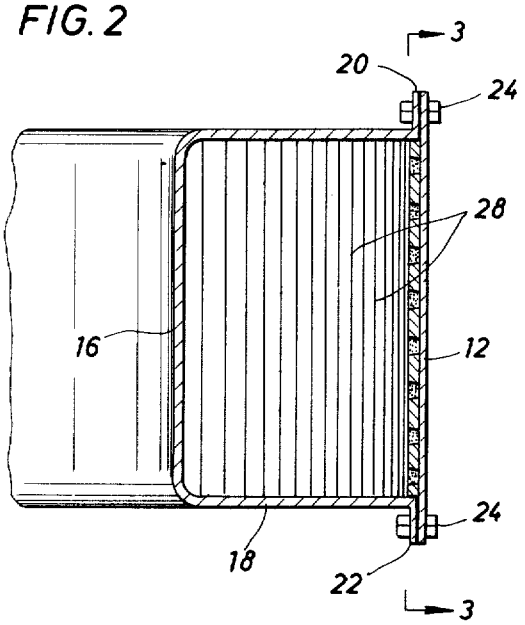
FIG. 3
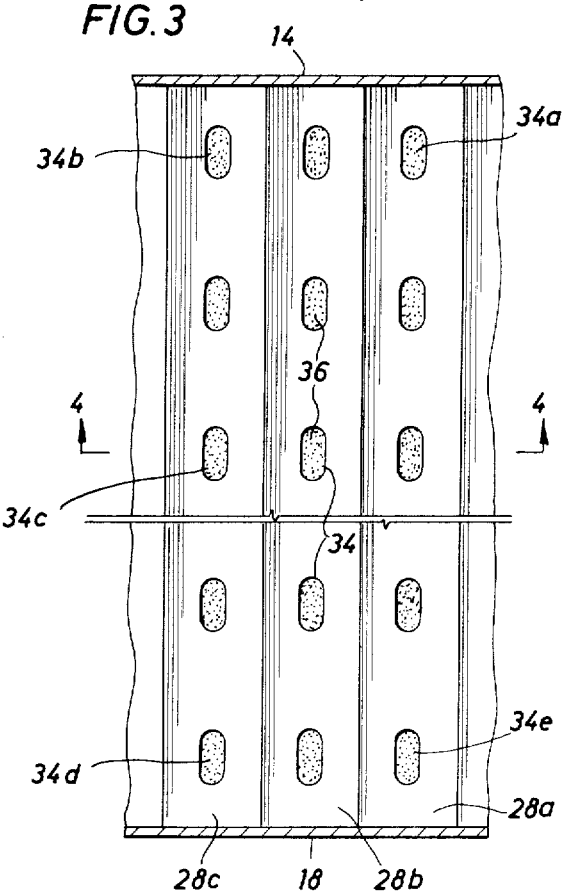
FIG. 4
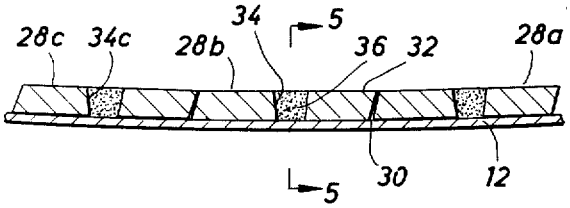
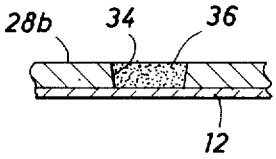
FIG. 5

METHOD OF MAKING A LINED CONDUIT SECTION

Matter enclosed in heavy brackets [ ] appears in the original patent but forms no part of this reissue specification; matter printed in italics indicates the additions made by reissue.

This is a continuation-in-part of Ser. No. 850,285, filed Nov. 10, 1977, and entitled "Lined Flat Back", now abandoned.

This invention relates to curved sections of conduits that are lined with wear resistant material to resist the erosive effect of solid material entrained in the fluid stream passing through the conduit.

It is common practice to transport solid particulate material by entraining the material in a fluid stream as it moves through a conduit. For example, in the operation of pulp mills, wood chips, sawdust and the like are moved to the desired location by entraining the particles in an air stream that is forced through a conduit. Unfortunately, such conduits very rarely travel in a straight line so there will be one or more sections in the conduit where the solid material will impinge against a side wall of the conduit as the fluid stream changes direction. As these solid particles impinge against the side wall of such sections, they will erode away the side wall requiring frequent replacement of these sections in the conduit. This has been a long-standing and well-recognized maintenance problem and much effort has been made to increase the life of these curved sections in this type of conduit.

It is an object of this invention to provide an improved curved section for connecting in a conduit of this type that is lined with wear-resistant material in the form of a plurality of side-by-side strips of the material that provide a continuous surface of wear-resistant material in position to receive the impact of the solid material carried by the fluid stream in the conduit.

It is a further object of this invention to provide such a curved section that is lined with a plurality of generally, rectangularly shaped elongated wear strips having their adjacent sides beveled so that one edge of one adjacent wear strip overlaps the edge of the adjacent strip to provide a continuous wear-resistant surface for receiving the impact of the solid material and which allows flat-sided wear strips of wear-resistant material that can be easily cast to be readily attached to the inside wall of a section of conduit even though the wall curves.

It is a further object of this invention to provide a wear strip or member of high abrasive material that is shaped so that a plurality of such members can be easily positioned in conduits that are circular or rectanular in cross section to provide a continuous abrasive-resistant surface to receive the impact of the solid material moving through the conduit.

It is a further object of this invention to provide a method of lining an inside surface of a conduit by which individual wear strips are attached to the inside surface of the conduit using a welding method that keeps the individual wear strips at a temperature below the temperature that will cause the strips to crack due to thermal stress and, yet will securely attach the strips in the desired position on the inside surface of a conduit.

These and other objects, advantages, and features of this invention will be apparent to those skilled in the art from a consideration of this specification, including the attached drawings and appended claims.

IN THE DRAWINGS

FIG. 1 is a side view partly in elevation and partly in section, of a curved section of conduit that is rectangular in cross-section and that is lined in accordance with this invention with a plurality of wear strips.

FIG. 2 is a sectional view taken along line 2—2 of FIG. 1.

FIG. 3 is a sectional view taken along line 3—3 of FIG. 2.

FIG. 4 is a sectional view of an enlarged scale taken along line 4—4 of FIG. 3.

FIG. 5 is a sectional view taken along line 5—5 of FIG. 4.

Figure 6:
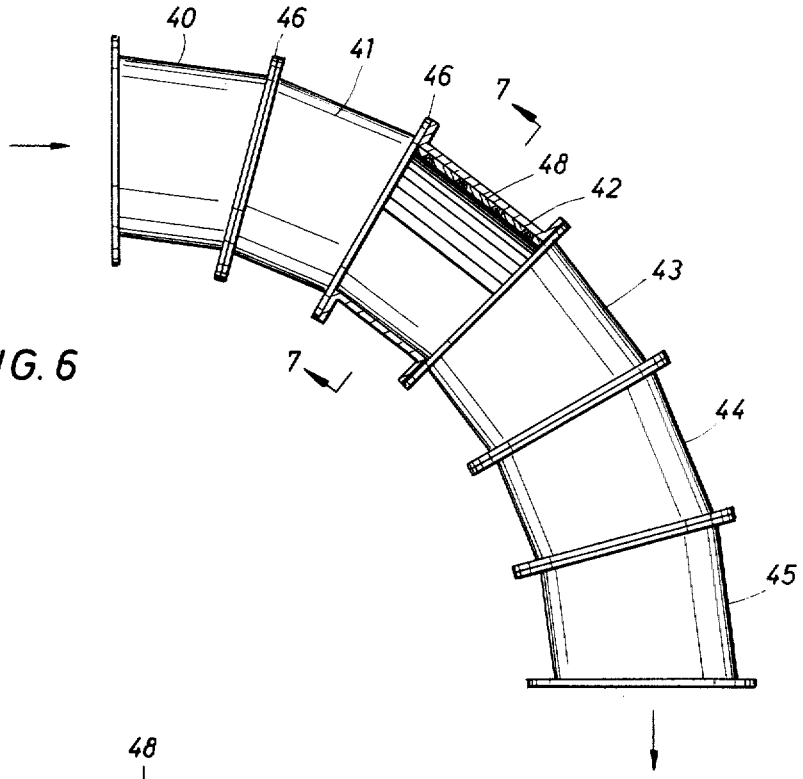
FIG. 6 is a curved section of a conduit that is tubular in cross section and that is provided with the wear strip in accordance with this invention.
Figure 7:
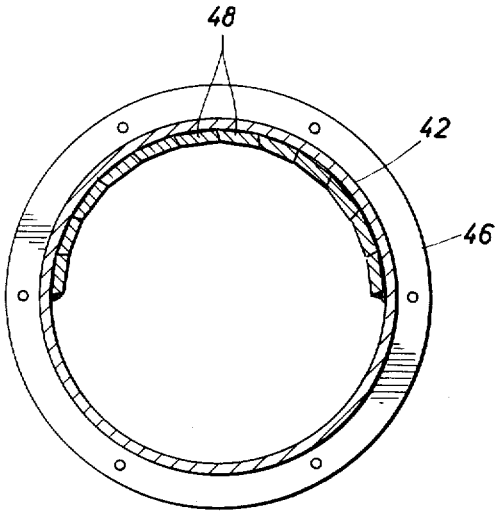
FIG. 7 is a sectional view taken along line 7—7 of FIG. 6.
Figure 8:
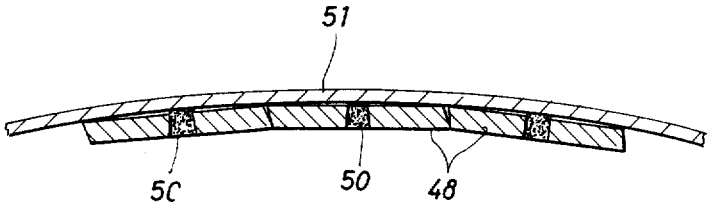
FIG. 8 is a cross-sectional view of an enlarged scale showing the relationship of the flat-sided wear strip relative to each other and to the curved side wall of the conduit.

FIGS. 1 through 5 show the invention of this application as applied to a curved section of conduit that is rectangular in cross-section. This is commonly referred to as a "lined flatback". This type section is so-called because the side wall against which the solid material impinges, i.e., the "wall, is flat in the transverse direction. For example, as shown in the drawings, conduit section 10 includes flatback sidewall 12 that is positioned so that any solid material carried by the fluid stream passing through this section of the conduit will impinge against this back wall as it is forced to change direction. The remainder of the conduit is made up of walls 14, 16, and 18 that are integrally connected together in this embodiment. Walls 14 and 18 are provided with longitudinally extending flanges 20 and 22 to which back wall 12 is attached by bolts 24. This allows the wall of the conduit that is subjected to the most severe abrasion to be easily removed and repaired or replaced, as required, without having to disconnect the section from its position in the conduit.

In accordance with this invention, the side wall of the conduit that receives the impact of the solid material as it moves through inlet 25 to outlet 26 is lined by a plurality of wear strips 28 that are positioned in side-by-side relationship and that are made of a hard material to provide a wear-resistant surface against which the solid material will impinge as it moves through the section of conduit.

In this embodiment, the wear members extend along a line transverse the longitudinal axis of the section. Several of the wear members are shown on an enlarged scale in FIG. 3. They extend between side wall 14 and 18 of the conduit, as shown, the wall 12 to which it is attached is positioned as shown in FIGS. 1 and 2. The flatback, or side 12, is flat in a transverse direction and curves in a longitudinal direction parallel to the radius of curvature of the section to which it is attached. Wear members 28 are elongated members that can be cast of wear resistant material without any pre-selected curvature and then arranged side-by-side along the curved back side of the conduit to provide a continuous wear resistant surface in the path of the particles carried through the conduit. This greatly simplifies the manufacture of the wear strips and allows the wear members to be used for different angles of curvature without being specially cast with a pre-selected shape.

This is accomplished in accordance with one feature of this invention by beveling the adjacent edges of the wear members as shown in FIG. 4. The angle of the bevel is selected so that edge 30 of wear strip 28a is overlapped by the outer edge 32 of wear strip 28b when the two are positioned as shown in FIG. 4. In this way, flat wear strips can be positioned side-by-side along a curved surface to provide a continuous protective cover for the underlying wall of the conduit. If the sides were straight only the outer edges could touch and any shifting of the strips would produce a gap between them.

The wear members, as stated above, are cast of extremely hard material so that they will resist erosion by the impingement of the solid material. One such material, for example, is tungsten carbide. Another is an alloy having a high chromium content. For examply, in one preferred alloy the chromium content is 27% with 3% carbon. This material being extremely hard is also very brittle and when subjected to uneven heating will tend to crack. Therefore, it is one of the features of this invention to provide a method for attached wear strips to the side wall of a section of conduit in a manner to avoid undue thermal stressing of the very hard and brittle material from which the wear strips are made.

In accordance with this feature of the invention, each wear strip is cast with a plurality of openings 34 spaced along its length, as shown in FIG. 3. These openings are smaller in cross section one one end than on the other. In other words, the walls of the opening taper so as to converge toward the side of the wear strip that is going to be attached to the inside wall of the conduit. Thus, the cross-sectional area of the openings adjacent side wall 12, as shown in FIGS. 4 and 5, is smaller in cross section than the section of the opening adjacent the outer surface of the wear members. This allows the opening to be filled with weld metal, indicated by the number 36, that does not have to fuse to the wear strips themselves in order to hold them in place. All that is required is that fusion occur between the relatively soft, usually low-carbon steel material that makes up the side wall of the conduit and due to the shape of the opening in 34 in which the weld metal is located will securely attach the wear members to the side walls.

It has been discovered, however, that to fill an opening 34 with weld metal in one operation will invariably raise the temperature of the wear strip adjacent the opening sufficiently to produce thermal stresses that will crack the strip. In other words, the strips are so hard and brittle that they cannot be welded to the back wall in the conventional manner.

In accordance with the method of this invention, the welder will line up the strips in the desired position on the surface of the conduit to be lined. The surface has to be generally flat, at least at the opening receiving weld metal. The welder than puddles a small amount of weld metal in one of the openings. Opening 34a in FIG. 3 for example. He carefully watches the material around the opening and by observation or by using a temperature stick stops puddling weld metal in the opening before the temperature around the opening approaches that when the strip may crack. He then moves to another, preferably remote, opening, such as 34b, 34d, or 34e and repeats the puddling operation. He may them move to 34c, etc, but eventually he will return to 34a, which has now cooled off and puddle more weld metal in the opening. This procedure is repeated until all of the openings are filled with weld metal.

The weld metal is not fused to the wear strips, but only to the side wall of the conduit. It has been discovered, however, that the puddled weld metal will draw carbon out of the wear strips in substantial amounts, which raises the hardness of the weld metal substantially. The hardness of the weld metal, in fact, is such that it resists erosion by the particulate matter flowing through the conduit almost as successfully as the wear material itself.

In FIGS. 6 through 9, the invention is shown applied to a tubular conduit, that is one that is circular in cross section. The curved section of conduit that is lined with the wear members of this invention is shown in FIG. 6 as being made up of a plurality of individual, generally straight sections 40 through 45. The end of each section is cut at an angle to its longitudinal axis and then the sections are connected together in a conventional manner by flanges 46 (the bolts are not shown) to form the curved section of the conduit. In this embodiment, each of sections 40 through 45 has the side wall against which the material will impinge covered by a plurality of wear strips 48 that extend parallel to the longitudinal axis of the sections to which they're attached. In other words, in this embodiment, the side walls to which the wear members are attached are generally straight or flat in the longitudinal direction and are curved in the transverse direction. Here again, by providing wear members with beveled sides they can be cast as flat members that are elongated in one direction and generally rectangular in cross section, the casting procedure is greatly simplified, as explained above. The overlapping bevelled edges function in the same manner as described above and as shown in FIGS. 4, 5, and 8.

These wear members are attached to the inside wall of the sections of conduit in the same manner as described above by welds 50 that are positioned in openings shaped in the same manner as shown in FIGS. 4 and 5.

As the generally flat-sides wear members are positioned adjacent to each other against the curved inside wall of the section, such as wall 51 or section 42, the outer edges of the adjacent members will contact and then the sides will diverge in the directon of the side wall. This void between the members may be filled with an epoxy resin containing particles of steel. In this way, should the overlapping adjacent edges of the wear members erode away, the relatively soft side wall of the conduit will be protected from direct impingement by the particles moving through the conduit by this mass of epoxy reinforced with the steel particles.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described what is claimed is:

1. A method of lining an inside surface of a conduit with a plurality of strips of hard, relatively brittle, wear resistant material formed into elongated relatively narrow strips that have openings therethrough that have smaller cross-sectional areas on one side than on the other said method comprising the steps of disposing the inside surface in a generally upwardly facing horizontal position, placing a plurality of the strips on the upwardly facing surface in adjacent side-by-side position with the ends of the openings in the strips with the smaller cross-sectional area adjacent the upwardly facing surface, puddling weld metal briefly in first one opening and then another remote from the first while allowing the weld metal in said first opening to cool, briefly puddling additional weld metal in said first one opening, likewise puddling weld metal in each said opening at plural brief intervals until each opening is filled to thereby maintain the temperature of the strips below that at which they will crack due to thermal stresses.

*2. A method of attaching to a surface of a conduit a strip of hard, relatively brittle, wear resistant material that has openings therethrough that have smaller cross-sectional areas on one side than on the other, said method comprising the steps of disposing the surface in a generally upwardly facing horizontal position, placing the strip on the upwardly facing surface with the ends of the openings in the strip with the smaller cross-sectional area adjacent the upwardly facing surface, puddling weld metal briefly in first one opening and then another remote from the first while allowing the weld metal in said first opening to cool, briefly puddling additional weld metal in said first one opening, likewise puddling weld metal in each said opening at plural brief intervals until each opening is filled to thereby maintain the temperature of the strip below that at which it will crack due to thermal stresses.*

* * * * *